US008411758B2

(12) United States Patent
Folgner et al.

(10) Patent No.: US 8,411,758 B2
(45) Date of Patent: Apr. 2, 2013

(54) METHOD AND SYSTEM FOR ONLINE REMIXING OF DIGITAL MULTIMEDIA

(75) Inventors: Michael George Folgner, San Francisco, CA (US); Ryan Brice Cunningham, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1577 days.

(21) Appl. No.: 11/622,920

(22) Filed: Jan. 12, 2007

(65) Prior Publication Data

US 2007/0179979 A1    Aug. 2, 2007

Related U.S. Application Data

(60) Provisional application No. 60/758,664, filed on Jan. 13, 2006, provisional application No. 60/790,569, filed on Apr. 10, 2006.

(51) Int. Cl.
*G11B 27/031* (2006.01)

(52) U.S. Cl. .................. 375/240.26; 386/278; 386/281; 386/283; 386/284; 386/285

(58) Field of Classification Search .................. 375/240
See application file for complete search history.

(56) References Cited

U.S. PATENT DOCUMENTS

| | | | | |
|---|---|---|---|---|
| 5,577,191 | A | * | 11/1996 | Bonomi ........................ 345/502 |
| 5,623,424 | A | * | 4/1997 | Azadegan et al. ............. 708/203 |
| 5,852,435 | A | * | 12/1998 | Vigneaux et al. ............. 345/428 |
| 6,005,621 | A | * | 12/1999 | Linzer et al. ............. 375/240.11 |
| 6,005,623 | A | * | 12/1999 | Takahashi et al. ....... 375/240.16 |
| 6,211,869 | B1 | * | 4/2001 | Loveman et al. ............. 715/723 |
| 6,374,260 | B1 | | 4/2002 | Hoffert et al. |
| 6,496,980 | B1 | | 12/2002 | Tillman et al. |
| 6,577,311 | B1 | * | 6/2003 | Crosby et al. ................. 345/428 |
| 6,615,212 | B1 | | 9/2003 | Dutta et al. |
| 2001/0033295 | A1 | * | 10/2001 | Phillips ........................ 345/723 |
| 2002/0067500 | A1 | | 6/2002 | Yokomizo et al. |
| 2002/0116716 | A1 | | 8/2002 | Sideman |
| 2002/0118300 | A1 | | 8/2002 | Middleton et al. |

(Continued)

FOREIGN PATENT DOCUMENTS

| | | |
|---|---|---|
| EP | 0969399 A2 | 1/2000 |
| JP | 11-066815 | 3/1999 |

(Continued)

OTHER PUBLICATIONS

Vass et al., Multiresolution-multicast video distribution over the Internet, Sep. 23, 2000, IEEE Wireless Communications and Networking Conference, vol. 3, pp. 1457-1461.*

(Continued)

*Primary Examiner* — Taghi Arani
*Assistant Examiner* — Kenneth Chang
(74) *Attorney, Agent, or Firm* — James J. DeCarlo; Greenberg Traurig, LLP

(57) ABSTRACT

Systems and methods have been developed for manipulating media assets in a networked computing environment where processing power, bandwidth and/or storage capacity may be limited. More specifically, systems and methods have been developed whereby low-resolution media assets may be created that are optimized for transfer over low bandwidth networks and for editing and manipulation in an environment with low processing power and low storage capacity, and a high-resolution media asset may be created for playback.

16 Claims, 11 Drawing Sheets

U.S. PATENT DOCUMENTS

| | | | |
|---|---|---|---|
| 2002/0144276 A1 | 10/2002 | Radford et al. | |
| 2002/0145622 A1 | 10/2002 | Kauffman et al. | |
| 2004/0027369 A1 | 2/2004 | Kellock et al. | |
| 2004/0128317 A1 | 7/2004 | Sull et al. | |
| 2004/0179740 A1 | 9/2004 | Yasuhiro | |
| 2004/0216173 A1* | 10/2004 | Horoszowski et al. | 725/145 |
| 2005/0033758 A1 | 2/2005 | Baxter | |
| 2005/0036547 A1* | 2/2005 | Vetro et al. | 375/240.12 |
| 2005/0041159 A1* | 2/2005 | Nakamura et al. | 348/722 |
| 2005/0091691 A1 | 4/2005 | Maruya et al. | |
| 2005/0144016 A1 | 6/2005 | Hewitt et al. | |
| 2005/0289180 A1 | 12/2005 | Pabla et al. | |

FOREIGN PATENT DOCUMENTS

| | | |
|---|---|---|
| JP | 2002-215123 | 7/2002 |
| JP | 2003-037804 | 2/2003 |
| JP | 2003-167695 | 6/2003 |
| JP | 2003-259273 | 9/2003 |
| JP | 2003-283994 | 10/2003 |
| JP | 2004-061455 | 2/2004 |
| JP | 2004-064789 | 2/2004 |
| JP | 2004-310889 A | 11/2004 |
| JP | 2005-045757 | 2/2005 |
| JP | 2005-070884 | 3/2005 |
| JP | 2005-117492 | 4/2005 |
| KR | 10-2001-0046018 A | 6/2001 |
| KR | 10-2004-0040406 | 5/2004 |
| KR | 10-2006-0003257 A | 1/2006 |

OTHER PUBLICATIONS

Adobe—Flash Player Version Penetration [online]. Adobe, Dec. 2006 [retrieved on Apr. 11, 2007]. Retrieved from the Internet: <http://adobe.com/products/player_census/flashplayer/version_penetration.html>.
One True Media Home [online]. One True Media, Inc., 2006 [retrieved on Nov. 7, 2006]. Retrieved from the Internet: <http://www.onetruemedia.com/>.
Supplementary European Search Report (EP 07 71 8203.8) dated Aug. 14, 2009; 1 page.
Supplementary Search Report (EP 07 70 7968) dated Aug. 5, 2009; 1 page.
Supplementary Search Report (EP 07 71 8157) dated Sep. 3, 2009; 1 page.
International Search Report (PCT/US2007/008916) dated May 27, 2010; 3 pages.
International Search Report (PCT/US07/60525), Dated Feb. 7, 2008.
International Search Report (PCT/US07/60528), Dated Feb. 7, 2008.
International Search Report (PCT/US07/60530), Dated Feb. 7, 2008.
Notification of Transmittal of The International Search Report and The Written Opinion of the International Searching Authority, or The Declaration (PCT/US07/60531), Feb. 8, 2008.

* cited by examiner

METHOD AND SYSTEM FOR ONLINE REMIXING OF DIGITAL MULTIMEDIA

RELATED APPLICATIONS

This application claims the benefit of U.S. Provisional Application No. 60/758,664, filed Jan. 13, 2006, which application is hereby incorporated herein by reference, and U.S. Provisional Application No. 60/790,569, filed Apr. 10, 2006, which application is hereby incorporated herein by reference.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

In the current Internet there exist many different types of media assets in the form of digital files. Digital files may contain data representing one or more types of content, including but not limited to, audio, images, and videos. For example, media assets include file formats such as MPEG-1 Audio Layer 3 ("MP3") for audio, Joint Photographic Experts Group ("JPEG") for images, Motion Picture Experts Group ("MPEG-2" and "MPEG-4") for video, Adobe Flash for animations, and executable files.

Such media assets are currently created and edited using applications executing locally on a dedicated computer. For example, in the case of digital video, popular applications for creating and editing media assets include Apple's iMovie and FinalCut Pro and Microsoft's MovieMaker. After creation and editing a media asset, one or more files may be transmitted to a computer (e.g., a server) located on a distributed network such as the Internet. The server may host the files for viewing by different users. Examples of companies operating such servers are YouTube (http://youtube.com) and Google Video (http://video.google.com).

Presently, users must create and/or edit media assets on their client computers before transmitting the media assets to a server. Many users are therefore unable able to edit media assets from another client where, for example, the user's client computer does not contain the appropriate application or media asset for editing. Moreover, editing applications are typically designed for professional or high-end consumer markets. Such applications do not address the needs of average consumers who lack dedicated computers with considerable processing power and/or storage capacity.

Additionally, average consumers typically do not have the transmission bandwidth necessary to transfer, share or access media assets that may be widespread across a network. Increasingly, many media assets are stored on computer connected to the Internet. For example, services such as Getty Images sell media assets (e.g., images) that are stored on computers connected to the Internet. Thus, when a user requests a media asset for manipulation or editing, the asset is typically transferred in its entirety over the network. Particularly in the case of digital video, such transfers may consume tremendous processing and transmission resources.

SUMMARY

Against this backdrop systems and methods have been developed for manipulating media assets in a networked computing environment where processing power, bandwidth and/or storage capacity may be limited. More specifically, systems and methods have been developed whereby low-resolution media assets may be created that are optimized for transfer over low bandwidth networks and for editing and manipulation in an environment with low processing power and low storage capacity, and a high-resolution media asset may be created for playback.

In one example (which example is intended to be illustrative and not restrictive), the present invention may be considered a method for editing a low-resolution media asset to generate a high-resolution edited media asset. The method includes receiving a request to edit a first high-resolution media asset from a requester. The method further includes transmitting a low-resolution media asset to the requester, the low-resolution media asset based upon the first high-resolution media asset. The method includes receiving from the requester an edit instruction associated with the low-resolution media asset. The method further includes generating a second high-resolution media asset based upon the first high-resolution media asset and the edit instruction associated with the low-resolution media asset.

In one example (which example is intended to be illustrative and not restrictive), the present invention may be considered a computer readable medium encoding or containing computer executable instructions for performing a method for editing a low-resolution media asset to generate a high-resolution edited media asset. The computer readable medium includes instructions for receiving a request to edit a first high-resolution media asset from a requester. The computer readable medium further includes instructions for transmitting a low-resolution media asset to the requester, the low-resolution media asset based upon the first high-resolution media asset. The computer readable medium includes instructions for receiving from a requestor an edit instruction associated with the low-resolution media asset. The computer readable medium further includes instructions for generating a second high-resolution media asset based upon the first high-resolution media asset and the edit instruction associated with the low-resolution media asset.

In one example (which example is intended to be illustrative and not restrictive), the present invention may be considered a system. The system includes a high-resolution media asset library. The system further includes a low-resolution media asset generator that generates low-resolution media assets from high-resolution media assets contained in the high-resolution media asset library. The system includes a high-resolution media asset editor that applies edits to a high-resolution media asset based on edits made to an associated low-resolution media asset.

In one example (which example is intended to be illustrative and not restrictive), the present invention may be considered a method. The method includes receiving a request to generate a video asset, the video asset identifying a starting frame and an ending frame in a keyframe master asset. The method further includes generating a first portion of the video asset, the first portion containing one or more keyframes associated with the starting frame, the keyframes obtained from the keyframe master asset. The method includes generating a second portion of the video asset, the second portion containing sets of the keyframes and optimized frames, the optimized frames obtained from an optimized master asset associated with the keyframe master asset.

In one example (which example is intended to be illustrative and not restrictive), the present invention may be considered a method. The method includes receiving a request to generate a video asset, the video asset identifying a starting frame and an ending frame in a master asset. The method further includes generating a first portion of the video asset, the first portion containing one or more keyframes associated with the starting frame, the keyframes obtained from a keyframe master asset corresponding to the master asset. The method includes generating a second portion of the video asset, the second portion containing sets of the keyframes and optimized frames, the optimized frames obtained from an optimized master asset corresponding to the master asset.

In one example (which example is intended to be illustrative and not restrictive), the present invention may be considered a method. The method includes receiving a request to generate a video asset, the video asset identifying a starting frame and an ending frame in an optimized master asset. The method further includes generating a keyframe master asset, based upon the optimized master asset, the keyframe master asset including one or more keyframes corresponding to the starting frame. The method includes generating a first portion of the video asset, the first portion including at least the starting frame identified in the optimized master asset. The method further includes generating a second portion of the video asset, the second portion including sets of the keyframes and optimized frames, the optimized frames obtained from the optimized master asset.

In one example (which example is intended to be illustrative and not restrictive), the present invention may be considered a computer readable medium encoding or containing computer executable instructions for performing a method. The computer readable medium includes instructions for receiving a request to generate a video asset, the video asset identifying a starting frame and an ending frame in a keyframe master asset. The computer readable medium further includes instructions for generating a first portion of the video asset, the first portion containing one or more keyframes associated with the starting frame, the keyframes obtained from the keyframe master asset. The computer readable medium includes instructions for generating a second portion of the video asset, the second portion containing sets of the keyframes and optimized frames, the optimized frames obtained from an optimized master asset associated with the keyframe master asset.

In one example (which example is intended to be illustrative and not restrictive), the present invention may be considered a computer readable medium encoding or containing computer executable instructions for performing a method. The computer readable medium includes instructions for receiving a request to generate a video asset, the video asset identifying a starting frame and an ending frame in a master asset. The computer readable medium further includes instructions for generating a first portion of the video asset, the first portion containing one or more keyframes associated with the starting frame, the keyframes obtained from a keyframe master asset corresponding to the master asset. The computer readable medium includes instructions for generating a second portion of the video asset, the second portion containing sets of the keyframes and optimized frames, the optimized frames obtained from an optimized master asset corresponding to the master asset.

In one example (which example is intended to be illustrative and not restrictive), the present invention may be considered a computer readable medium encoding or containing computer executable instructions for performing a method. The computer readable medium includes instructions for receiving a request to generate a video asset, the video asset identifying a starting frame and an ending frame in an optimized master asset. The computer readable medium further includes instructions for generating a keyframe master asset, based upon the optimized master asset, the keyframe master asset including one or more keyframes corresponding to the starting frame. The computer readable medium includes instructions for generating a first portion of the video asset, the first portion including at least the starting frame identified in the optimized master asset. The computer readable medium further includes instructions for generating a second portion of the video asset, the second portion including sets of the keyframes and optimized frames, the optimized frames obtained from the optimized master asset.

In one example (which example is intended to be illustrative and not restrictive), the present invention may be considered a system. The system includes a master asset library that stores at least one high-resolution master asset. The system further includes a specification applicator that stores at least one edit specification for applying edits to the at least one high-resolution master asset. The system includes a master asset editor that applies the at least one edit specification to the at least one high-resolution master asset. The system further includes an edit asset generator that generates a low-resolution asset corresponding to the high-resolution master asset.

In one example (which example is intended to be illustrative and not restrictive), the present invention may be considered a method. The method includes editing a low-resolution media asset, the low-resolution media asset corresponding to a master high-resolution media asset. The method further includes generating an edit specification based on the editing of the low-resolution media asset. The method includes applying the edit specification to the master high-resolution media asset to create an edited high-resolution media asset.

In one example (which example is intended to be illustrative and not restrictive), the present invention may be considered a computer-readable medium having stored thereon a data structure. The computer readable medium includes a first data field comprising data identifying a high-resolution media asset. The computer readable medium further includes a second data field comprising data describing one or more edits made to a low-resolution media asset associated with the high-resolution media asset.

In one example (which example is intended to be illustrative and not restrictive), the present invention may be considered a method for identifying edit information of a media asset. The method includes editing a low resolution media asset, the low resolution media asset containing at least a first portion corresponding to a first high-resolution master media asset and a second portion corresponding to a second high-resolution master media asset. The method further includes receiving a request to generate a high-resolution edited media asset, the request identifying the first high-resolution master media asset and the second high-resolution master media asset. The method includes generating the high-resolution edited media asset. The method further includes associating with the high-resolution edited media asset edit information that identifies the first high-resolution master media asset and the second high-resolution master media asset.

In one example (which example is intended to be illustrative and not restrictive), the present invention may be considered a computer readable medium encoding or containing computer executable instructions for performing a method for identifying edit information of a media asset. The method includes editing a low resolution media asset, the low resolution media asset containing at least a first portion corresponding to a first high-resolution master media asset and a second portion corresponding to a second high-resolution master media asset. The method further includes receiving a request to generate a high-resolution edited media asset, the request identifying the first high-resolution master media asset and the second high-resolution master media asset. The method includes generating the high-resolution edited media asset. The method further includes associating with the high-resolution edited media asset edit information that identifies the first high-resolution master media asset and the second high-resolution master media asset.

In one example (which example is intended to be illustrative and not restrictive), the present invention may be considered a method for rendering a media asset. The method includes receiving a command to render an aggregate media asset defined by an edit specification, the edit specification identifying at least a first media asset associated with at least one edit instruction. The method further includes retrieving the edit specification. The method includes retrieving the first media asset. The method further includes rendering, on a media asset rendering device, the first media asset of the aggregate media asset in accordance with the at least one edit instruction.

In one example (which example is intended to be illustrative and not restrictive), the present invention may be considered a computer readable medium encoding or containing computer executable instructions for performing a method for rendering a media asset. The method includes receiving a command to render an aggregate media asset defined by an edit specification, the edit specification identifying at least a first media asset associated with at least one edit instruction. The method further includes retrieving the edit specification. The method includes retrieving the first media asset. The method further includes rendering, on a media asset rendering device, the first media asset of the aggregate media asset in accordance with the at least one edit instruction.

In one example (which example is intended to be illustrative and not restrictive), the present invention may be considered a method for editing an aggregate media asset. The method includes, in a playback session, receiving a stream corresponding to an aggregate media asset from a remote computing device, the aggregate media asset comprised of at least one component media asset. The method further includes rendering the aggregate media asset on an image rendering device. The method includes receiving a user command to edit an edit specification associated with the aggregate media asset. The method further includes initiating an edit session for editing the edit specification associated with the aggregate media asset.

In one example (which example is intended to be illustrative and not restrictive), the present invention may be considered a computer readable medium encoding or containing computer executable instructions for performing a method for editing an aggregate media asset. The method includes, in a playback session, receiving a stream corresponding to an aggregate media asset from a remote computing device, the aggregate media asset comprised of at least one component media asset. The method further includes rendering the aggregate media asset on an image rendering device. The method includes receiving a user command to edit an edit specification associated with the aggregate media asset. The method further includes initiating an edit session for editing the edit specification associated with the aggregate media asset.

In one example (which example is intended to be illustrative and not restrictive), the present invention may be considered a method for storing an aggregate media asset. The method includes storing a plurality of component media assets. The method further includes storing a first aggregate edit specification, the first aggregate edit specification including at least one command for rendering the plurality of component media assets to generate a first aggregate media asset.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
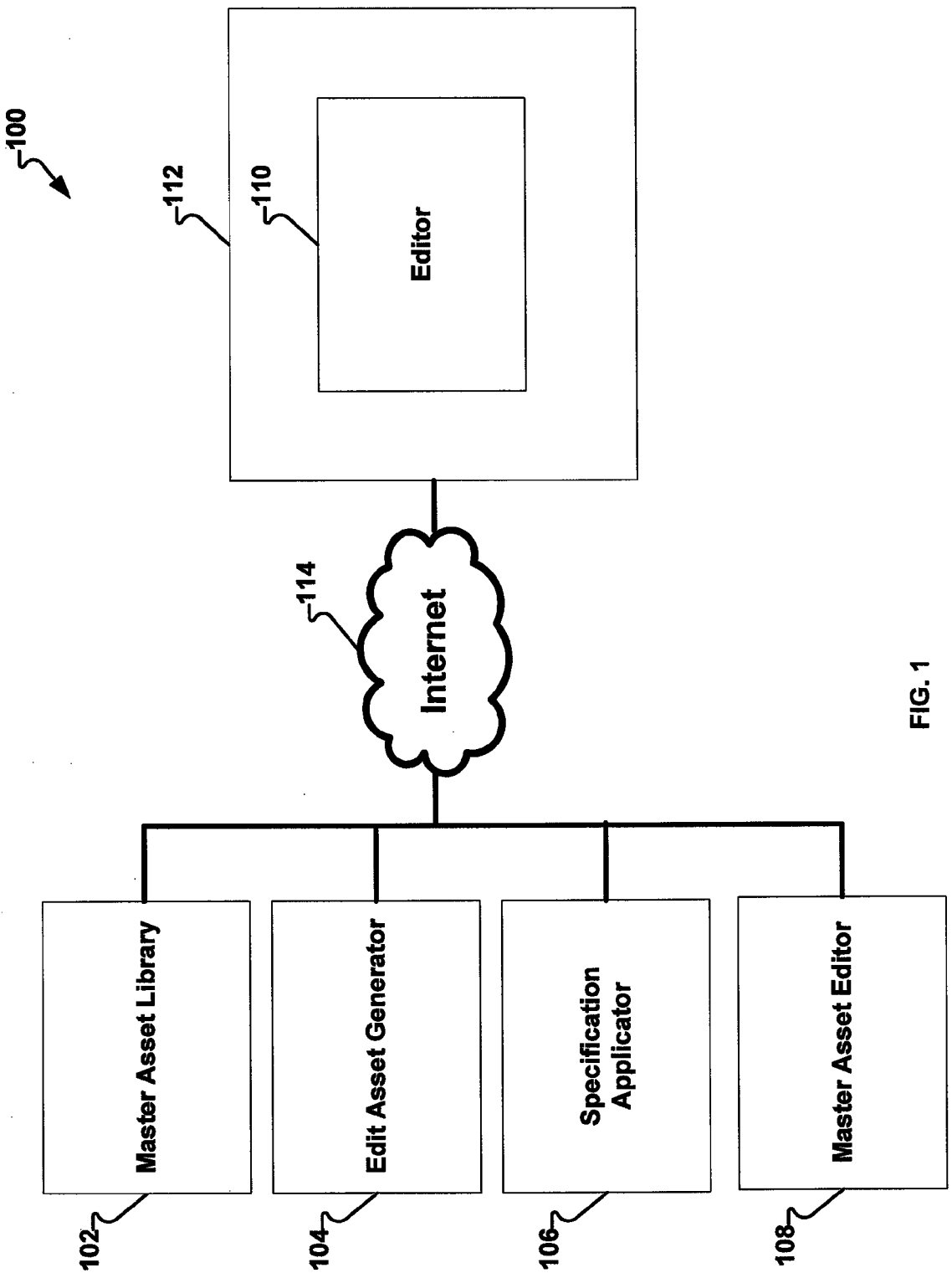
FIG. 1 illustrates an embodiment of a system for manipulating a media asset in a networked computing environment.

FIG. 1 illustrates an embodiment of a system 100 for generating a media asset. In one embodiment, a system 100 is comprised of a master asset library 102. In one embodiment, a master asset library 102 may be a logical grouping of data, including but not limited to high-resolution and low-resolution media assets. In another embodiment, a master asset library 102 may be a physical grouping of data, including but not limited to high-resolution and low-resolution media assets. In an embodiment, a master asset library 102 may be comprised of one or more databases and reside on one or more servers. In one embodiment, master asset library 102 may be comprised of a plurality of libraries, including public, private, and shared libraries. In one embodiment, a master asset library 102 may be organized into a searchable library. In another embodiment, the one or more servers comprising master asset library 102 may include connections to one or more storage devices for storing digital files.

For purposes of this disclosure, the drawings associated with this disclosure, and the appended claims, the term "files" generally refers to a collection of information that is stored as a unit and that, among other things, may be retrieved, modified, stored, deleted or transferred. Storage devices may include, but are not limited to, volatile memory (e.g., RAM, DRAM), non-volatile memory (e.g., ROM, EPROM, flash memory), and devices such as hard disk drives and optical drives. Storage devices may store information redundantly. Storage devices may also be connected in parallel, in a series, or in some other connection configuration. As set forth in the present embodiment, one or more assets may reside within a master asset library 102.

For purposes of this disclosure, the drawings associated with this disclosure, and the appended claims, an "asset" refers to a logical collection of content that may be comprised within one or more files. For example, an asset may be comprised of a single file (e.g., an MPEG video file) that contains images (e.g., a still frame of video), audio, and video information. As another example, an asset may also may be comprised of a collection of files (e.g., JPEG image files) that collectively may be used to render an animation or video. As yet another example, an asset may also comprise an executable file (e.g., an executable vector graphics file, such as an SWF file or an FLA file). A master asset library 102 may include many types of assets, including but not limited to, video, images, animations, text, executable files, and audio. In one embodiment, master asset library 102 may include one or more high-resolution master assets. For the remainder of this disclosure, "master asset" will be disclosed as a digital file containing video content. One skilled in the art will recognize, however, that a master asset is not limited to containing video information, and as set forth previously, a master asset may contain many types of information including but not limited to images, audio, text, executable files, and/or animations.

In one embodiment, a media asset may be stored in a master asset library 102 so as to preserve the quality of the media asset. For example, in the case of a media asset comprising video information, two important aspects of video quality are spatial resolution and temporal resolution. Spatial resolution generally describes the clarity of lack of blurring in a displayed image, while temporal resolution generally describes the smoothness of motion. Motion video, like film, consists of a certain number of frames per second to represent motion in the scene. Typically, the first step in digitizing video is to partition each frame into a large number of picture elements, or pixels or pels for short. The larger the number of pixels, the higher the spatial resolution. Similarly, the more frames per second, the higher the temporal resolution.

In one embodiment, a media asset may be stored in a master asset library 102 as a master asset that is not directly manipulated. For example, a media asset may be preserved in a master asset library 102 in its original form, although it may still be used to create copies or derivative media assets (e.g., low-resolution assets). In one embodiment, a media asset may also be stored in a master asset library 102 with corresponding or associated assets. In one embodiment, a media asset stored in a master asset library 102 may be stored as multiple versions of the same media asset. For example, multiple versions of a media asset stored in master asset library 102 may include an all-keyframe version that does not take advantage of intra-frame similarities for compression purposes, and an optimized version that does take advantage of intra-frame similarities. In one embodiment, the original media asset may represent an all-keyframe version. In another embodiment, the original media asset may originally be in the form of an optimized version or stored as an optimized version. One skilled in the art will recognize that media assets may take many forms within a master asset library 102 that are within the scope of this disclosure.

In one embodiment, a system 100 is also comprised of an edit asset generator 104. In an embodiment, an edit asset generator 104 may be comprised of transcoding hardware and/or software that, among other things, may convert a media asset from one format into another format. For example, a transcoder may be used to convert an MPEG file into a Quicktime file. As another example, a transcoder may be used to convert a JPEG file into a bitmap (e.g., *.BMP) file. As yet another example, a transcoder may standardize media asset formats into an Flash video file (*.FLV) format. In one embodiment, a transcoder may create more than one versions of an original media asset. For example, upon receiving an original media asset, a transcoder may convert the original media asset into a high-resolution version and a low-resolution version. As another example, a transcoder may convert an original media asset into one or more files. In one embodiment, a transcoder may exist on a remote computing device. In another embodiment, a transcoder may exist on one or more connected computers. In one embodiment, an edit asset generator 104 may also be comprised of hardware and/or software for transferring and/or uploading media assets to one or more computers. In another embodiment, an edit asset generator 104 may be comprised of or connected to hardware and/or software used to capture media assets from external sources such as a digital camera.

In one embodiment, an edit asset generator 104 may generate a low-resolution version of a high-resolution media asset stored in a master asset library 102. In another embodiment, an edit asset generator 104 may transmit a low-resolution version of a media asset stored in a master asset library 102, for example, by converting the media asset in real-time and transmitting the media asset as a stream to a remote computing device. In another embodiment, an edit asset generator 104 may generate a low quality version of another media asset (e.g., a master asset), such that the low quality version preserves while still providing sufficient data to enable a user to apply edits to the low quality version.

In one embodiment, a system 100 may also be comprised of a specification applicator 106. In one embodiment, a specification applicator 106 may be comprised of one or more files or edit specifications that include instructions for editing and modifying a media asset (e.g., a high-resolution media asset). In one embodiment, a specification applicator 106 may include one or more edit specifications that comprise modification instructions for a high-resolution media asset based upon edits made to a corresponding or associated low-resolution media asset. In one embodiment, a specification applicator 106 may store a plurality of edit specifications in one or more libraries.

In one embodiment, a system 100 is also comprised of a master asset editor 108 that may apply one or more edit specifications to a media asset. For example, a master asset editor 108 may apply an edit specification stored in a specification applicator 106 library to a first high-resolution media asset and thereby creates another high-resolution media asset, e.g., a second high-resolution media asset. In one embodiment, a master asset editor 108 may apply an edit specification to a media asset in real-time. For example, a master asset editor 108 may modify a media asset as the media asset is transmitted to another location. In another embodiment, a master asset editor 108 may apply an edit specification to a media asset in non-real-time. For example, a master asset editor 108 may apply edit specifications to a media asset as part of a scheduled process. In one embodiment, a master asset editor 108 may be used to minimize the necessity of transferring large media assets over a network. For example, by storing edits in an edit specification, a master asset editor 108 may transfer small data files across a network to effectuate manipulations made on a remote computing device to higher quality assets stored on one or more local computers (e.g., computers comprising a master asset library).

In another embodiment, a master asset editor 108 may be responsive to commands from a remote computing device (e.g., clicking a "remix" button at a remote computing device may command the master asset editor 108 to apply an edit specification to a high-resolution media asset). For example, a master asset editor 108 may dynamically and/or interactively apply an edit specification to a media asset upon a user command issuing from a remote computing device. In one embodiment, a master asset editor 108 may dynamically apply an edit specification to a high-resolution to generate an edited high-resolution media asset for playback. In another embodiment, a master asset editor 108 may apply an edit specification to a media asset on a remote computing device and one or more computers connected by a network (e.g., Internet 114). For example, bifurcating the application of an edit specification may minimize the size of the edited high-resolution asset prior to transferring it to a remote computing device for playback. In another embodiment, a master asset editor 108 may apply an edit specification on a remote computing device, for example, to take advantage of vector-based processing that may be executed efficiently on a remote computing device at playtime.

In one embodiment, a system 100 is also comprised of an editor 110 that may reside on a remote computing device 112 that is connected to one or more networked computers, such as the Internet 114. In one embodiment, an editor 110 may be comprised of software. For example, an editor 110 may be a stand-alone program. As another example, an editor 110 may be comprised of one or more instructions that may be executed through another program such as an Internet 114 browser (e.g., Microsoft Internet Explorer). In one embodiment, an editor 110 may be designed with a user interface similar to other media-editing programs. In one embodiment, an editor 110 may contain connections to a master asset library 102, an edit asset library 104, a specification applicator 106 and/or a master asset editor 108. In one embodiment, an editor 110 may include pre-constructed or "default" edit specifications that may be applied by a remote computing device to a media asset. In one embodiment, an editor 110 may include a player program for displaying media assets and/or applying one or more instructions from an edit specification upon playback of a media asset. In another embodiment, an editor 110 may be connected to a player program (e.g., a standalone editor may be connected to a browser).

Figure 2:
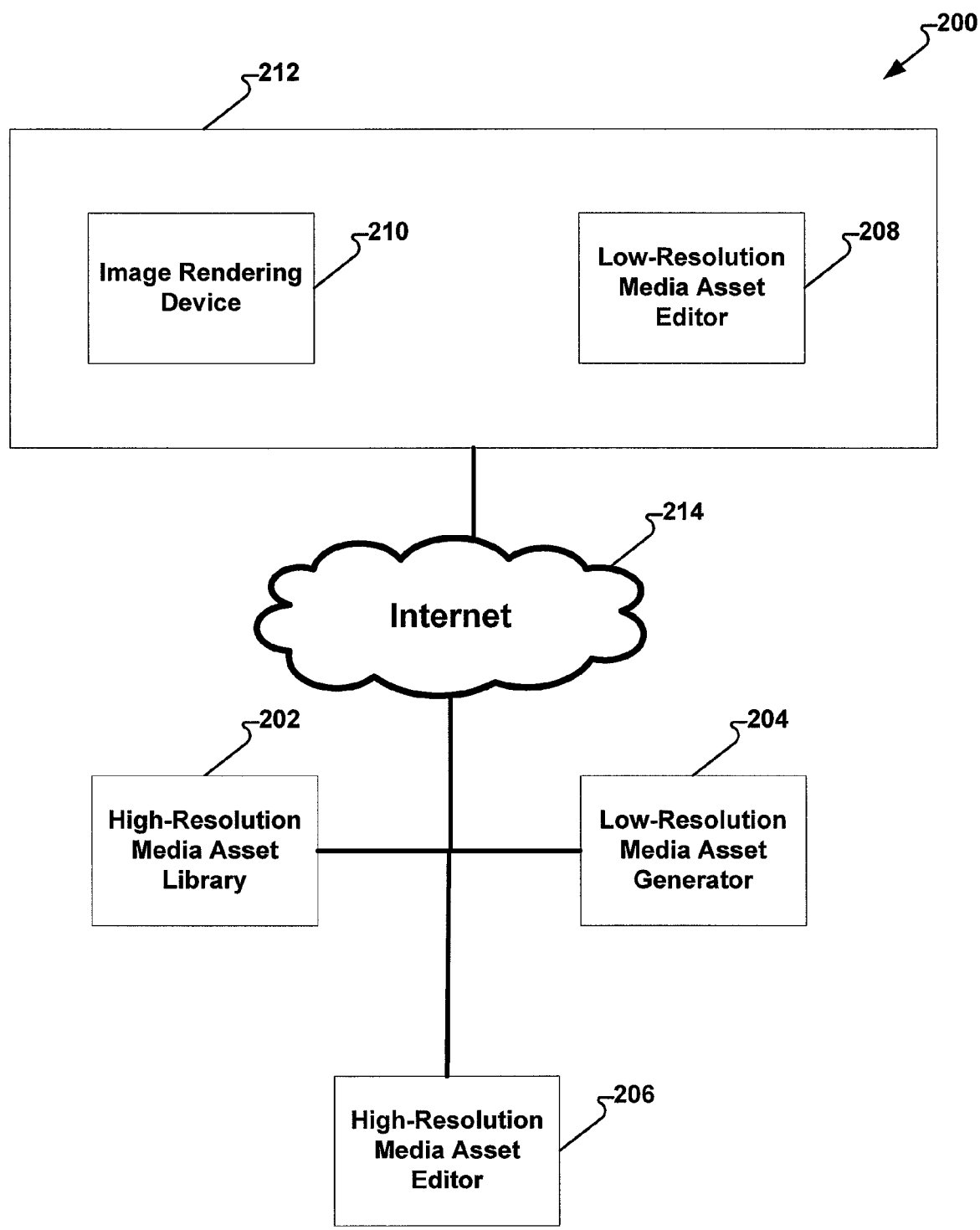
FIG. 2 illustrates an embodiment of a system for manipulating a media asset in a networked computing environment.

FIG. 2 illustrates an embodiment of a system 200 for generating a media asset. In one embodiment, the system 200 comprises a high-resolution media asset library 202. In one embodiment, the high-resolution media asset library 202 may be a shared library, a public library, and/or a private library. In one embodiment, the high-resolution media asset library 202 may include at least one video file. In another embodiment, the high resolution media asset library 202 may include at least one audio file. In yet another embodiment, the high-resolution media asset library 202 may include at least one reference to a media asset residing on a remote computing device 212. In one embodiment, the high-resolution media asset library 202 may reside on a plurality of computing devices.

In one embodiment, the system 200 further comprises a low-resolution media asset generator 204 that generates low-resolution media assets from high-resolution media assets contained in the high-resolution media asset library. For example, as discussed above, a low-resolution media asset generator 204 may convert a high-resolution media asset to a low-resolution media asset.

In one embodiment, the system 200 further comprises a low-resolution media asset editor 208 that transmits edits made to an associated low-resolution media asset to one or more computers via a network, such as the Internet 214. In another embodiment, the low-resolution media asset editor 208 may reside on a computing device remote from the high resolution media asset editor, for example, remote computing device 212. In another embodiment, the low-resolution media asset editor 208 may utilize a browser. For example, the low-resolution media asset editor 208 may store low-resolution media assets in the cache of a browser.

In one embodiment, the system 200 may also comprise an image rendering device 210 that displays the associated low-resolution media asset. In one embodiment, an image rendering device 210 resides on a computing device 212 remote from the high-resolution media asset editor 206. In another embodiment, an image rendering device 210 may utilize a browser.

In one embodiment, the system 200 further comprises a high-resolution media asset editor 206 that applies edits to a high-resolution media asset based on edits made to an associated low-resolution media asset.

Figure 3:
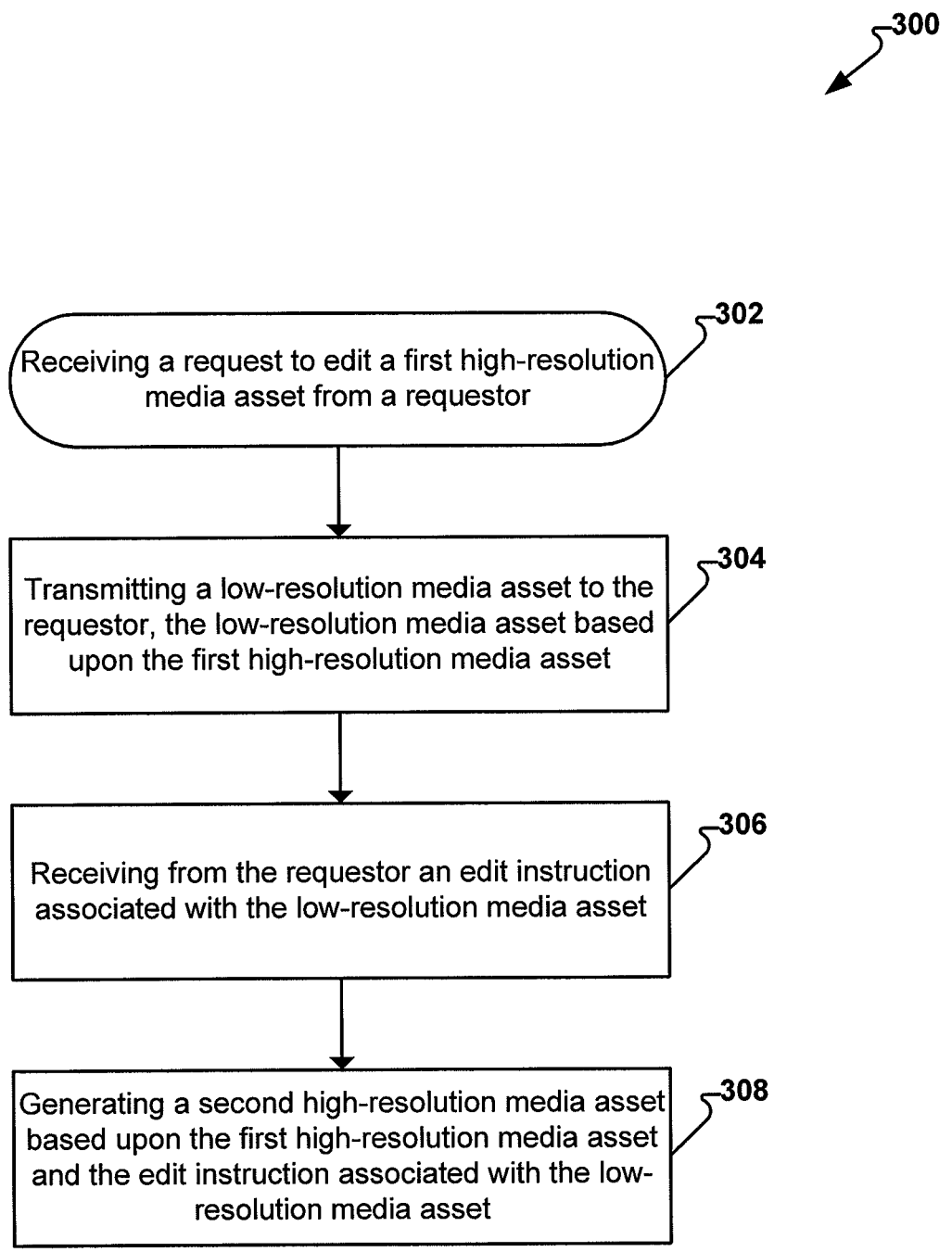
FIG. 3 illustrates an embodiment of a method for editing a low-resolution media asset to generate a high-resolution edited media asset.

FIG. 3 illustrates an embodiment of a method 300 for editing a low-resolution media asset to generate a high-resolution edited media asset. In the method 300, a request to edit a first high-resolution media is received from a requester in a requesting operation 302. In one embodiment, the first high-resolution media asset may be comprised of a plurality of files and receiving a request to edit the first high-resolution media asset in requesting operation 302 may further comprise receiving a request to edit at least one of the plurality of files. In another embodiment, requesting operation 302 may further comprise receiving a request to edit at least one high-resolution audio or video file.

In the method 300, a low-resolution media asset based upon the first high-resolution media asset is transmitted to a requestor in a transmitting operation 304. In one embodiment, transmitting operation 304 may comprise transmitting at least one low-resolution audio or video file. In another embodiment, transmitting operation 304 may further comprise converting at least one high-resolution audio or video file associated with a first high-resolution media asset from a first file format into at least one low-resolution audio or video file, respectively, having a second file format. For example, a high-resolution uncompressed audio file (e.g., a WAV file) may be converted into a compressed audio file (e.g., an MP3 file). As another example, a compressed file with a lesser compression ratio may be converted into a file of the same format, but formatted with a greater compression ratio.

The method 300 then comprises receiving from a requestor an edit instruction associated with a low-resolution media asset in receiving operation 306. In one embodiment, receiving operation 306 may further comprise receiving an instruction to modify a video presentation property of at least one high-resolution video file. For example, modification of a video presentation property may include receiving an instruction to modify an image aspect ratio, a spatial resolution value, a temporal resolution value, a bit rate value, or a compression value. In another embodiment, receiving operation 306 may further comprise receiving an instruction to modify a timeline (e.g., sequence of frames) of at least one high-resolution video file.

The method 300 further comprises generating a second high-resolution media asset based upon the first high-resolution media asset and the edit instruction associated with the low-resolution media asset in a generating operation 308. In one embodiment of generating operation 308, an edit specification is applied to at least one high-resolution audio or video file comprising the first high-resolution media asset. In a further embodiment, generating operation 308 generates at least one high-resolution audio or video file. In another embodiment, generating operation 308 further comprises the steps of: generating a copy of at least one high-resolution audio or video file associated with a first high-resolution media asset; applying the edit instruction, respectively, to the at least one high-resolution audio or video file; and saving the copy as a second high-resolution media asset.

In another embodiment of method 300, at least a portion of the second high-resolution media asset may be transmitted to a remote computing device. In still yet another embodiment of method 300, at least a portion of the second high-resolution media asset may be displayed by an image rendering device. For example, the image rendering device may take the form of a browser residing at a remote computing device.

Figure 4:
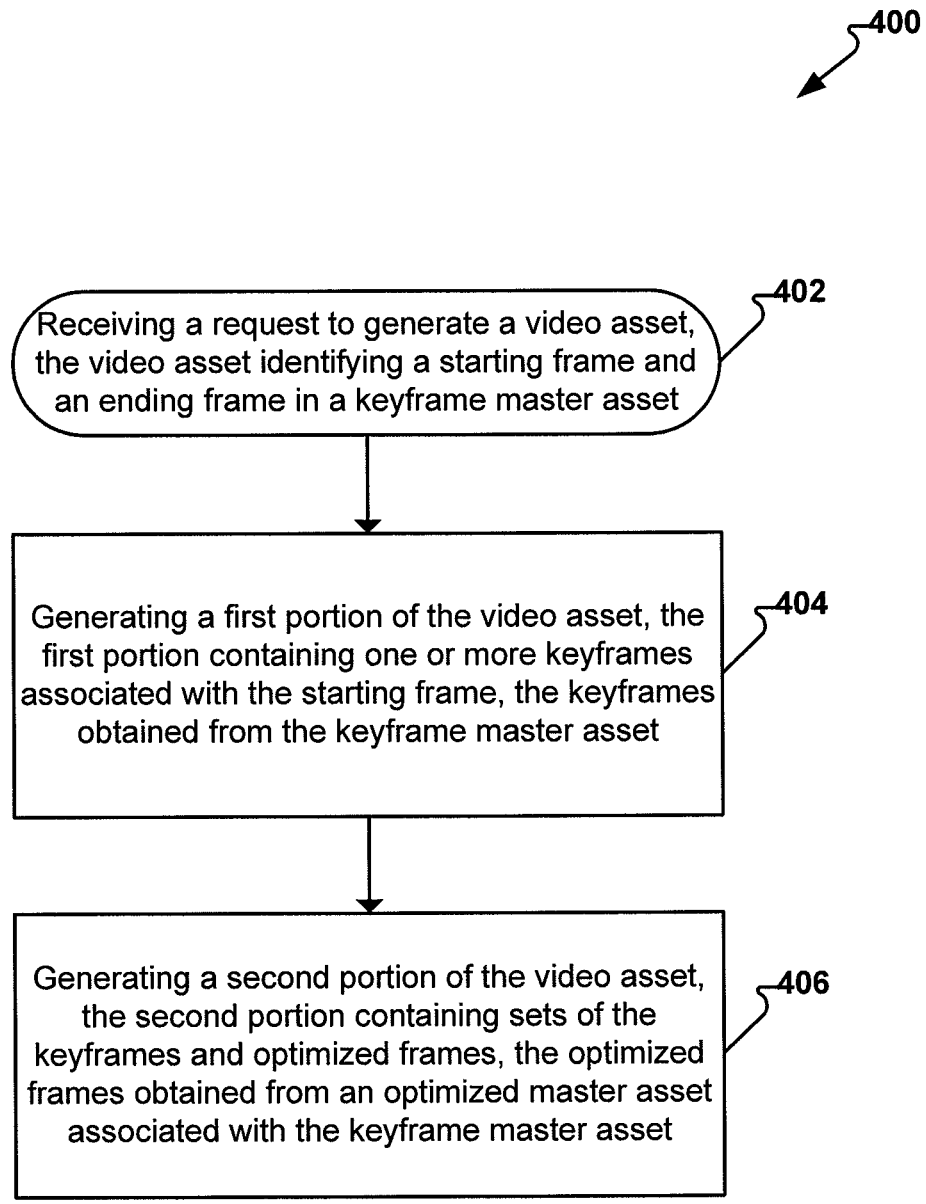
FIG. 4 illustrates an embodiment of a method for generating a media asset.

FIG. 4 illustrates an embodiment of a method 400 for generating a media asset. In the method 400, a request to generate a video asset, the video asset identifying a starting frame and an ending frame in a keyframe master asset, is received in receiving operation 402. For example, the request of receiving operation 402 may identify a first portion and/or a second portion of a video asset.

In a generating a first portion operation 404, the method 400 then comprises generating a first portion of the video asset where the first portion contains one or more keyframes associated with the starting frame and the keyframes are obtained from the keyframe master asset. For example, where the keyframe master asset comprises an uncompressed video file, one or more frames of the uncompressed video file may comprise the keyframes associated with the starting frame of the media asset.

In a generating a second portion operation 406, the method 400 further comprises generating a second portion of the video asset where the second portion contains sets of the keyframes and optimized frames and the optimized frames obtained from an optimized master asset associated with the keyframe master asset. For example, where the optimized master asset comprises a compressed video file, a set of frames that are compressed may be combined in a video asset with one or more uncompressed frames from an uncompressed video file.

In another embodiment of method 400, a library of master assets may be maintained such that a keyframe master asset and an optimized master asset may be generated corresponding to at least one of the library master assets. In still yet another embodiment of method 400, a request may identify a starting keyframe or ending keyframe in a keyframe master asset that corresponds, respectively, to a starting frame or ending frame.

Figure 5:
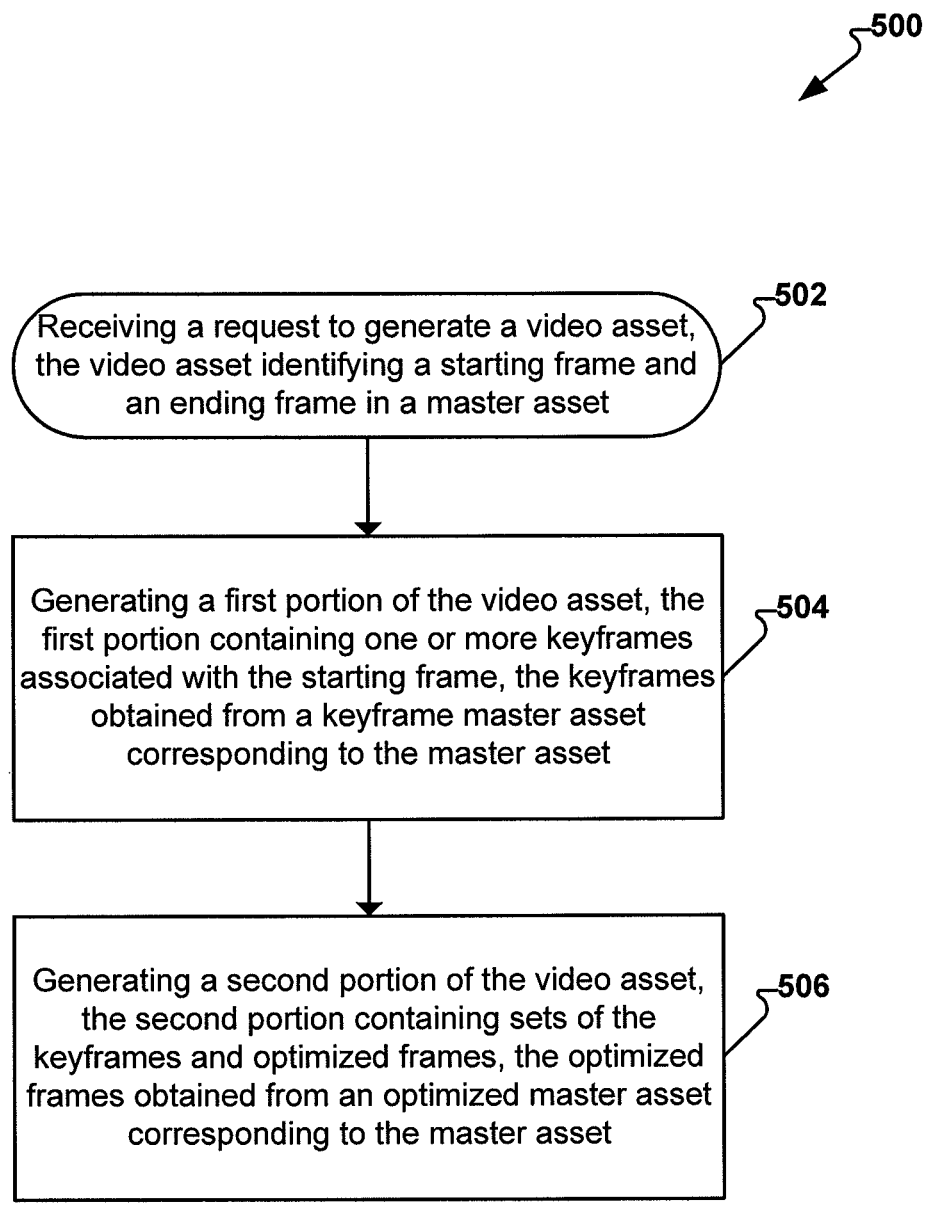
FIG. 5 illustrates an embodiment of a method for generating a media asset.

FIG. 5 illustrates an embodiment of a method 500 for generating a media asset. In the method 500, a request to generate a video asset, the video asset identifying a starting frame and an ending frame in a master asset, is received in receiving operation 502. For example, the request of receiving operation 502 may identify a first portion and/or a second portion of a video asset.

In a generating a first portion operation 504, the method 500 then comprises generating a first portion of the video asset where the first portion contains one or more keyframes associated with the starting frame and the keyframes obtained from a keyframe master asset correspond to a master asset. For example, In a generating a second portion operation 506, the method 500 then comprises generating a second portion of the video asset where the second portion contains sets of the keyframes and optimized frames and the optimized frames obtained from an optimized master asset correspond to a master asset. For example, where the optimized master asset comprises a compressed video file, a set of frames that are compressed may be combined in a video asset with one or more uncompressed keyframes from a keyframe master asset.

In another embodiment of method 500, a library of master assets may be maintained such that a keyframe master asset and an optimized master asset may be generated corresponding to at least one of the library master assets. In still yet another embodiment of method 500, a request may identify a starting keyframe or ending keyframe in a keyframe master asset that corresponds, respectively, to a starting frame or ending frame.

Figure 6:
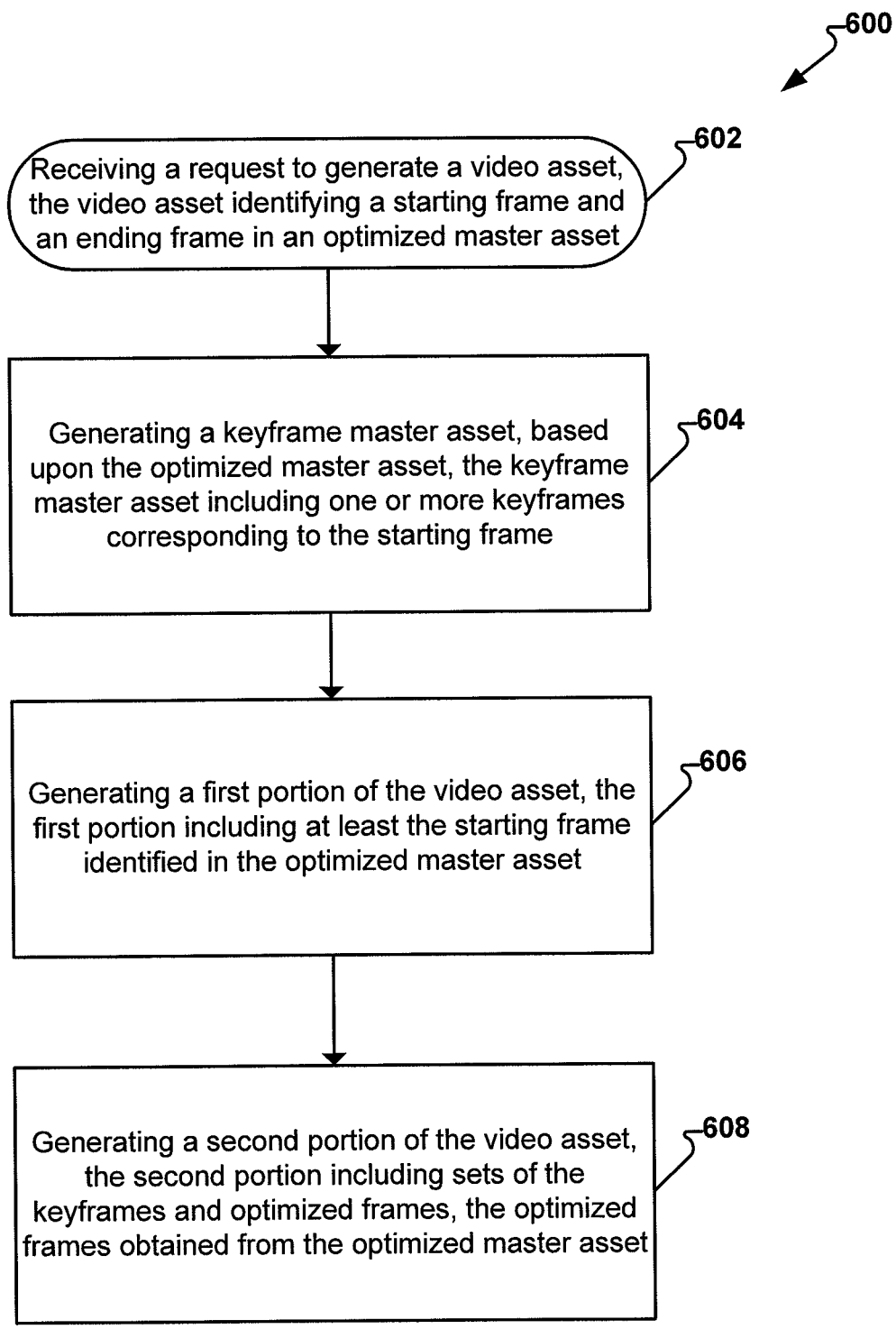
FIG. 6 illustrates an embodiment of a method for generating a media asset.

FIG. 6 illustrates an embodiment of a method 600 for generating a media asset. In the method 600, a request to generate a video asset where the video asset identifies a starting frame and an ending frame in an optimized master asset is received in a receiving operation 602. For example, the request of receiving operation 602 may identify a first portion and/or a second portion of a video asset.

The method 600 then comprises generating a keyframe master asset, based upon the optimized master asset, that includes one or more keyframes corresponding to the starting frame in a generating a keyframe operation 604. In a generating a first portion operation 606, the method 600 further comprises generating a first portion of the video asset where the first portion includes at least a starting frame identified in an optimized master asset. In a generating a second portion operation 608, the method 600 then further comprises generating a second portion of the video asset where the second portion includes sets of keyframes and optimized frames and the optimized frames are obtained from the optimized master asset.

In another embodiment of method 600, a library of master assets may be maintained such that a keyframe master asset and an optimized master asset may be generated corresponding to at least one of the library master assets. In still yet another embodiment of method 600, a request may identify a starting keyframe or ending keyframe in a keyframe master asset that corresponds, respectively, to a starting frame or ending frame.

Figure 7:
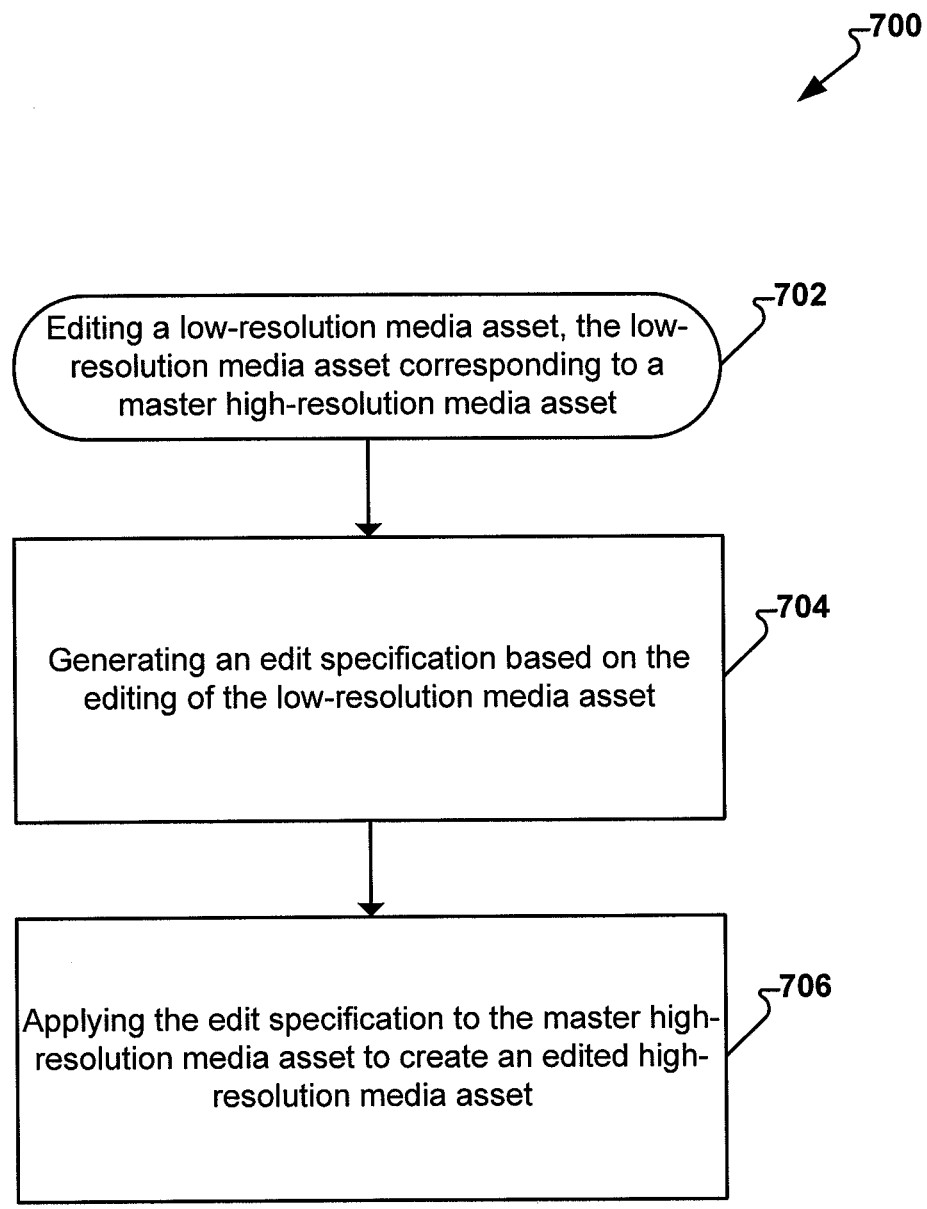
FIG. 7 illustrates an embodiment of a method for recording edits to media content.

FIG. 7 illustrates an embodiment of a method 700 for recording edits to media content. In the method 700, a low-resolution media asset corresponding to a master high-resolution media asset is edited in editing operation 702. In one embodiment, editing comprises modifying an image of a low-resolution media asset that corresponds to a master high-resolution media asset. For example, where an image includes pixel data, the pixels may be manipulated such that they appear in a different color or with a different brightness. In another embodiment, editing comprises modifying the duration of a low-resolution media asset corresponding to a duration of a master high-resolution media asset. For example, modifying a duration may include shortening a low-resolution media asset and the high-resolution media asset corresponding to the low-resolution media asset.

In a further embodiment, where the master high-resolution media asset and the low-resolution media asset comprise at least one or more frames of video information, the editing comprises modifying a transition property of the at least one or more frames of video information of a low-resolution media asset that corresponds to a master high-resolution media asset. For example, a transition such as a fade-in or fade-out transition may replace an image of one frame with an image of another frame. In another embodiment, editing comprises modifying a volume value of an audio component of a low-resolution media asset corresponding to a master high-resolution media asset. For example, a media asset including video information may include an audio track that may be played louder or softer depending upon whether a greater or lesser volume value is selected.

In another embodiment, where the master high-resolution media asset and the low-resolution media asset comprise at least two or more frames of sequential video information, editing comprises modifying the sequence of the at least two or more frames of sequential video information of a low-resolution media asset corresponding to a master high-resolution media asset. For example, a second frame may be sequenced prior to a first frame of a media asset comprising video information.

In still yet another embodiment, editing comprises modifying one or more uniform resource locators (e.g., URLs) associated with a low-resolution media asset corresponding to a master high-resolution media asset. In still another embodiment, editing comprises modifying a playback rate (e.g., 30 frames per second) of the low-resolution media asset corresponding to the master high-resolution media asset. In yet another embodiment, editing comprises modifying the resolution (e.g., the temporal or spatial resolution) of a low-resolution media asset corresponding to a master high-resolution media asset. In one embodiment, editing may occur on a remote computing device. For example, the edit specification itself may be created on a remote computing device. Similarly, for example, the edited high-resolution media asset may be transmitted to the remote computing device for rendering on an image rendering device such as a browser.

The method 700 then comprises generating an edit specification based on the editing of the low-resolution media asset in a generating operation 704. The method 700 further comprises applying the edit specification to the master high-resolution media asset to create an edited high-resolution media asset in an applying operation 706. In one embodiment, the method 700 further comprises rendering an edited high-resolution media asset on an image-rendering device. For example, rendering an edited high-resolution media asset may itself comprise applying a media asset filter to the edited high-resolution media asset. As another example, applying the media asset filter may comprise overlaying the edited high-resolution media asset with an animation. As yet another example, applying the media asset filter may further comprise changing a display property of the edited high-resolution media asset. Changing a display property may include, but is not limited to, changing a video presentation property. In this example, applying the media asset filter may comprise changing a video effect, a title, a frame rate, a trick-play effect (e.g., a media asset filter may change a fast-forward, pause, slow-motion and/or rewind operation), and/or a composite display (e.g., displaying at least a portion of two different media assets at the same time, such as in the case of picture-in-picture and/or green-screen compositions). In another embodiment, the method 700 may further comprise storing an edit specification. For example, an edit specification may be stored at a remote computing device or one or more computers connected via a network, such as via the Internet.

Figure 8:
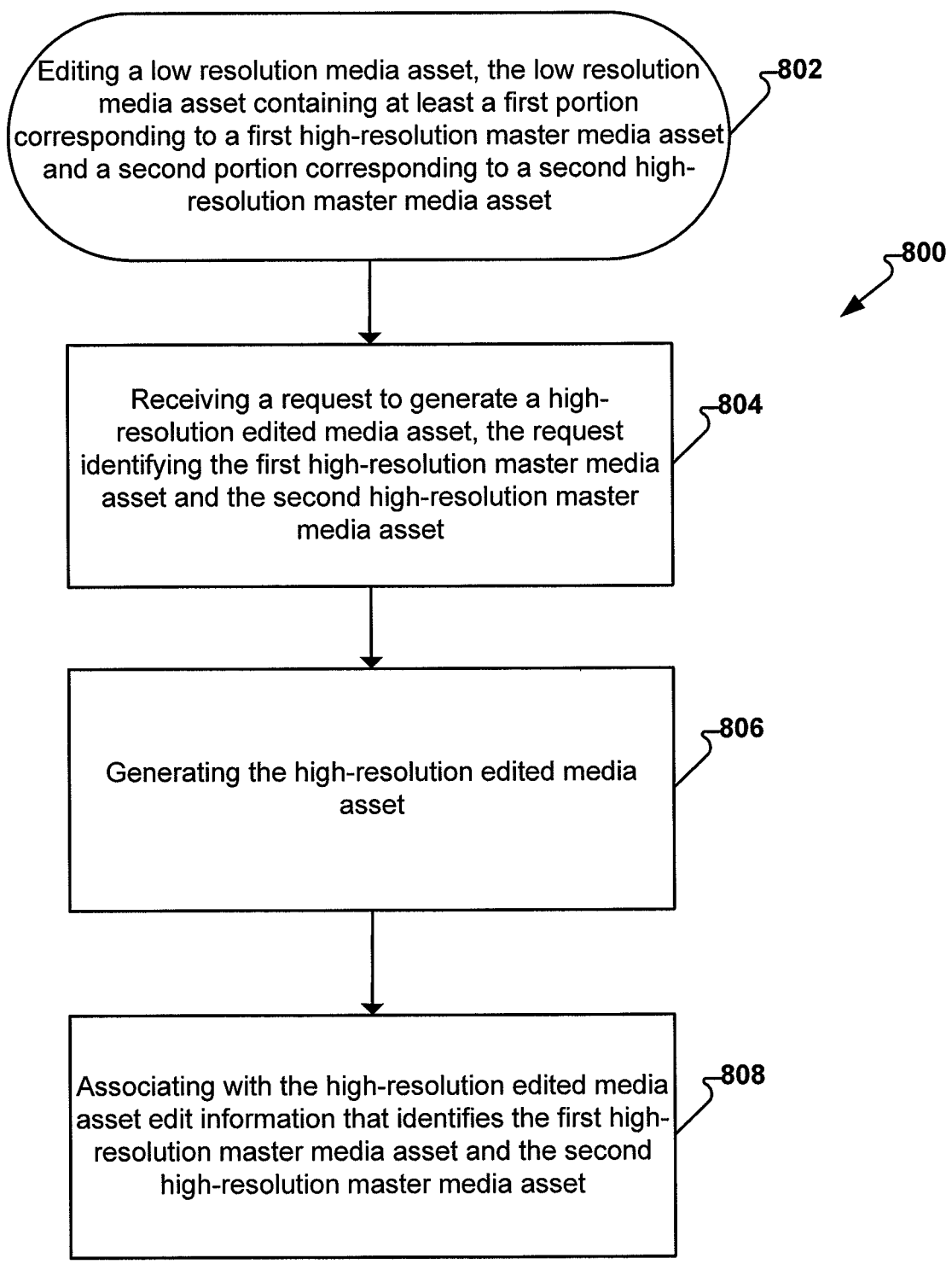
FIG. 8 illustrates an embodiment of a method for identifying edit information of a media asset.

FIG. 8 illustrates an embodiment of a method 800 for identifying edit information of a media asset. In the method 800, a low-resolution media asset is edited in an editing operation 802 where the low-resolution media asset contains at least a first portion corresponding to a first high-resolution master media asset and a second portion corresponding to a second high-resolution master media asset. In one embodiment, editing operation 802 further comprises storing at least some of the edit information as metadata with a high-resolution edited media asset. In another embodiment, editing operation 802 may occur on a remote computing device.

In receiving operation 804, the method 800 then comprises receiving a request to generate a high-resolution edited media asset where the request identifies a first high-resolution master media asset and a second high-resolution master media asset. The method 800 then comprises generating a high-resolution edited media asset in a generating operation 806. The method 800 further comprises associating with a high-resolution edited media asset edit information that identifies the first high-resolution master media asset and the second high-resolution master media asset in an associating operation 808.

In one embodiment, method 800 further comprises retrieving either a first high-resolution master media asset or a second high-resolution master media asset. In yet another embodiment, method 800 still further comprises assembling a retrieved first high-resolution media asset and a retrieved second high-resolution media asset into a high-resolution edited media asset.

Figure 9:
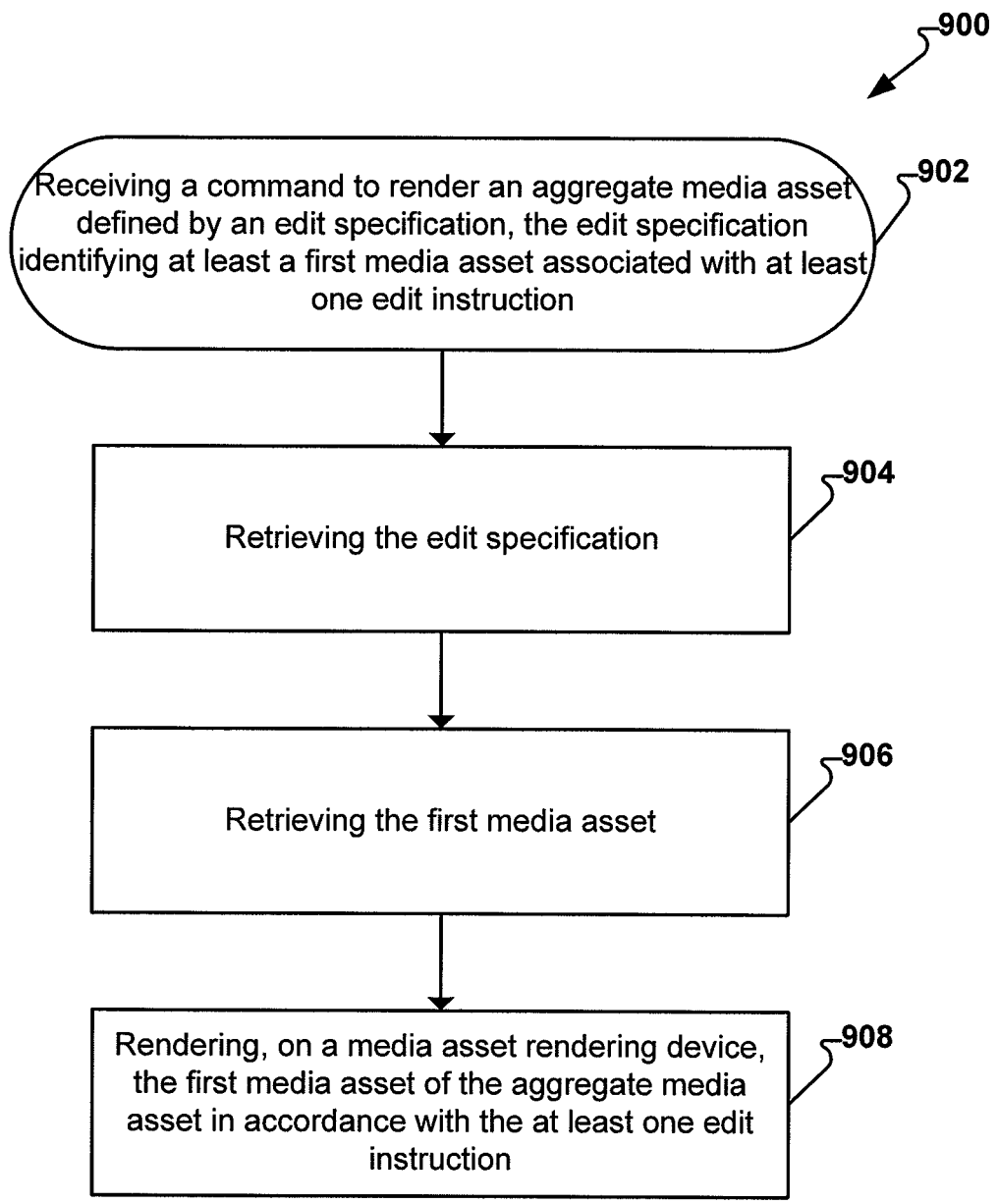
FIG. 9 illustrates an embodiment of a method for rendering a media asset.

FIG. 9 illustrates an embodiment of a method 900 for rendering a media asset. In the method 900, a command to render an aggregate media asset defined by an edit specification, where the edit specification identifies at least a first media asset associated with at least one edit instruction, is received in receiving operation 902. In one embodiment, receiving operation 902 comprises an end-user command. In another embodiment, receiving operation 902 may comprise a command issued by a computing device, such as a remote computing device. In yet another embodiment, receiving operation 902 may be comprised of a series of commands that together represents a command to render an aggregate media asset defined by an edit specification.

In edit specification retrieving operation 904, an edit specification is retrieved. In an embodiment, retrieving operation 904 may comprise retrieving an edit specification from memory or some other storage device. In another embodiment, retrieving operation 904 may comprise retrieving an edit specification from a remote computing device. In yet another embodiment, retrieving an edit specification in retrieving operation 904 may comprise retrieving several edit specifications that collectively comprise a single related edit specification. For example, several edit specifications may be associated with different media assets (e.g., the acts of a play may each comprise a media asset) that together comprise a single related edit specification (e.g., for an entire play, inclusive of each act of the play). In one embodiment, the edit specification may identify a second media asset associated with a second edit instruction that may be retrieved and rendered on a media asset rendering device.

In media asset retrieving operation 906, a first media asset is retrieved. In one embodiment, retrieving operation 906 may comprise retrieving a first media asset from a remote computing device. In another embodiment, retrieving operation 906 may comprise retrieving a first media asset from memory or some other storage device. In yet another embodiment, retrieving operation 906 may comprise retrieving a certain portion (e.g., the header or first part of a file) of a first media asset. In another embodiment of retrieving operation 906, a first media asset may be comprised of multiple subparts. Following the example set forth in retrieving operation 904, a first media asset in the form of a video (e.g., a play with multiple acts) may be comprised of media asset parts (e.g., multiple acts represented as distinct media assets). In this example, the edit specification may contain information that links together or relates the multiple different media assets into a single related media asset.

In rendering operation 908, the first media asset of the aggregate media asset is rendered on a media asset rendering device in accordance with the at least one edit instruction. In one embodiment, the edit instruction may identify or point to a second media asset. In one embodiment, the media asset rendering device may be comprised of a display for video information and speakers for audio information. In an embodiment where there exists a second media asset, the second media asset may include information that is similar to the first media asset (e.g., both the first and second media assets may contain audio or video information) or different from the first media asset (e.g., the second media asset may contain audio information, such as a commentary of a movie, whereas the first media asset may contain video information, such as images and speech, for a movie). In another embodiment, rendering operation 908 may further include an edit instruction that modifies a transition property for transitioning from a first media asset to a second media asset, that overlays effects and/or titles on an asset, that combines two assets (e.g., combinations resulting from edit instructions directed towards picture-in-picture and/or green-screen capabilities), that modifies the frame rate and/or presentation rate of at least a portion of a media asset, that modifies the duration of the first media asset, that modifies a display property of the first media asset, or that modifies an audio property of the first media asset.

Figure 10:
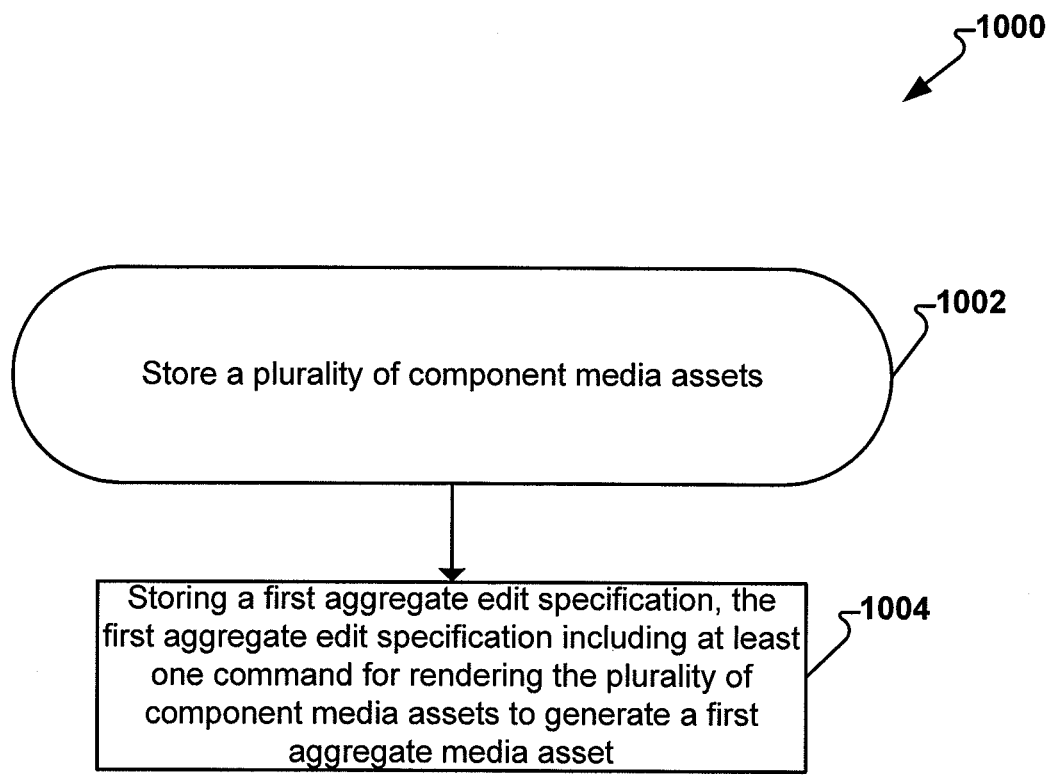
FIG. 10 illustrates an embodiment of a method for storing an aggregate media asset.

FIG. 10 illustrates an embodiment of a method 1000 for storing an aggregate media asset. In the method 1000, a plurality of component media assets are stored in storing operation 1002. For example, by way of illustration and not of limitation, storing operation 1002 may comprise caching at least one of the plurality of component media assets in memory. As another example, one or more component media assets may be cached in the memory cache reserved for a program such as an Internet browser.

In storing operation 1004, a first aggregate edit specification is stored where the first aggregate edit specification includes at least one command for rendering the plurality of component media assets to generate a first aggregate media asset. For example, an aggregate media asset may comprise one or more component media assets containing video information. In this example, the component videos may be ordered such that they may be rendered in a certain order as an aggregate video (e.g., a video montage). In one embodiment, storing operation 1004 comprises storing at least one command to display, in a sequence, a first portion of the plurality of component media assets. For example, the command to display may modify the playback duration of a component media asset including video information. In another embodiment of storing operation 1004, at least one command to render an effect corresponding to at least one of the plurality of component media assets may be stored. As one example, storing operation 1004 may include one or more effects that command transitions between component media assets. In still yet another embodiment of storing operation 1004, a second aggregate edit specification, the second aggregate edit specification including at least one command for rendering the plurality of component media assets to generate a second aggregate media asset may be stored.

Figure 11:
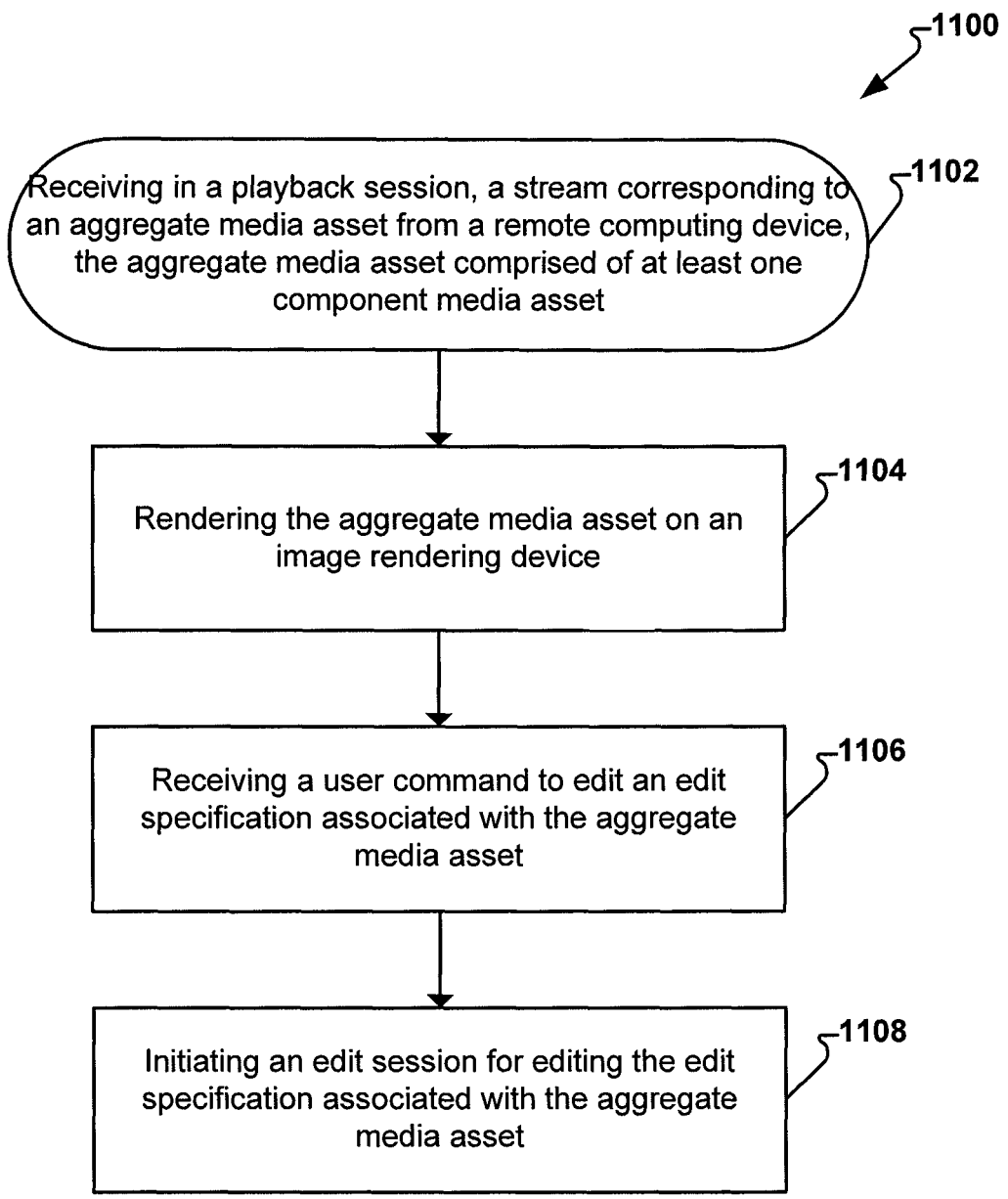
FIG. 11 illustrates an embodiment of a method for editing an aggregate media asset.

FIG. 11 illustrates an embodiment of a method for editing an aggregate media asset. In the method 1100, a stream corresponding to an aggregate media asset from a remote computing device, the aggregate media asset comprised of at least one component media asset, is received in a playback session in receiving operation 1102. For example, a playback session may be comprised of a user environment that permits playback of a media asset. As another example, a playback session may be comprised of one or more programs that may display one or more files. Following this example, a playback session may be comprised of an Internet browser that is capable of receiving a streaming aggregate media asset. In this example, the aggregate media asset may be comprised of one or more component media assets residing on remote computing devices. The one or more component media assets may be streamed so as to achieve bandwidth and processing efficiency on a local computing device.

In a rendering operation 1104, the aggregate media asset is rendered on an image rendering device. For example, the aggregate media asset may be displayed such that pixel information from an aggregate media asset including video information is shown. In a receiving operation 1106, a user command to edit an edit specification associated with the aggregate media asset is received. As discussed previously, edit specifications may take many forms, including but not limited to one or more files containing metadata and other information associated with the component media assets that may be associated with an aggregate media asset.

In an initiating operation 1108, an edit session is initiated for editing the edit specification associated with the aggregate media asset. In one embodiment, initiating operation 1108 comprises displaying information corresponding to the edit specification associated with the aggregate media asset. For example, an editing session may permit a user to adjust the duration of a certain component media asset. In another embodiment, method 1100 further comprises modifying the edit specification associated with the aggregate media asset, thereby altering the aggregate media asset. Following the previous example, once a component media asset is edited in the editing session, the edits to the component media asset may be made to the aggregate media asset.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, an edit specification may further include instructions for layering multiple audio tracks together or splicing different audio samples together. As another example, the online reconfiguration of three-dimensional gaming environments (e.g., the editing of a 3D game environment) may be accomplished using the methods and systems described for generating low-resolution media assets corresponding to high-resolution media assets. As yet another example, the methods and systems described herein may permit interactive reconfiguration of Internet web pages.

Numerous other changes may be made which will readily suggest themselves to those skilled in the art and which are encompassed in the spirit of the invention disclosed and as defined in the appended claims.

What is claimed is:

1. A method comprising:
    receiving, over a network at a computing device, a request to edit a first high-resolution media asset from a requester;
    transmitting, over the network, a low-resolution media asset to the requester in response to the request, the low-resolution media asset based upon the first high-resolution media asset;
    receiving, over the network at the computing device, an edit instruction associated with the low-resolution media asset from the requester, the edit instruction identifies keyframes that are consistent between the low-resolution media asset and the first high-resolution media asset, wherein the edit instruction comprises an instruction to modify a presentation property of at least one high resolution video file comprised within the first high-resolution media asset and an instruction to modify a format property of at least one high-resolution audio file comprised within the first high-resolution media asset; and
    generating, via the computing device, a second high-resolution media asset different from the first high-resolution media asset based upon the first high-resolution media asset and the edit instruction associated with the low-resolution media asset, wherein generating the second high-resolution media asset comprises:
        applying the edit instruction to the at least one high-resolution video file;
        generating a copy of the at least one high-resolution video file;
        applying the edit instruction to the copy of the at least one high-resolution video file;
        applying the edit instruction to the at least one high-resolution audio file;
        generating a copy of the at least one high-resolution audio file;
        applying the edit instruction to the copy of the at least one high resolution audio file;
        saving the copy of the at least one high-resolution video file and the copy of the at least one high-resolution audio file as an aggregate media asset forming the second high-resolution media asset.

2. The method of claim 1 further comprising:
    transmitting at least a portion of the second high-resolution media asset to a remote computing device; and
    facilitating visible display at least a portion of the second high-resolution media asset by an image rendering device associated with the remote computing device.

3. The method of claim 1 wherein the first high-resolution media asset comprises a plurality of files and receiving a request to edit the first high-resolution media asset further comprises receiving a request to edit at least one of the plurality of files.

4. The method of claim 1 wherein receiving a request to edit a first high-resolution media asset further comprises:
    receiving a request to edit the at least one high-resolution video file.

5. The method of claim 1, wherein the presentation property is selected from a group consisting of an image aspect ratio, a spatial resolution value, a temporal resolution value, a bit rate value, and a compression value, wherein receiving the edit instruction further comprises:
    receiving an instruction to modify a timeline of the at least one high-resolution video file.

6. The method of claim 1 wherein transmitting the low-resolution media asset further comprises:
    converting the at least one high-resolution video file associated with the first high-resolution media asset from a first file format into at least one low-resolution video file having a second file format; and
    transmitting at least one low-resolution video file.

7. The method of claim 1 wherein transmitting the low-resolution media asset further comprises:
    transmitting at least one low-resolution audio file; and
    converting at least one high-resolution audio file associated with the first high-resolution media asset from a first file format into at least one low-resolution audio file having a second file format.

8. A non-transitory computer readable storage medium tangibly encoded with computer executable instructions, that when executed by a computing device, perform a method comprising:
    receiving a request to edit a first high-resolution media asset from a requester;
    transmitting a low-resolution media asset to the requester in response to the request, the low-resolution media asset based upon the first high-resolution media asset;
    receiving from a requester an edit instruction associated with the low-resolution media asset, the edit instruction identifies keyframes that are consistent between the low-resolution media asset and the first high-resolution media asset, wherein the edit instruction comprises an instruction to modify a presentation property of at least one high resolution video file comprised within the first high-resolution media asset and an instruction to modify a format property of at least one high-resolution audio file comprised within the first high-resolution media asset; and
    generating a second high-resolution media asset different from the first high-resolution media asset based upon the first high-resolution media asset and the edit instruction associated with the low-resolution media asset, wherein generating the second high-resolution media asset comprises:
        applying the edit instruction to the at least one high-resolution video file;
        generating a copy of the at least one high-resolution video file;
        applying the edit instruction to the copy of the at least one high-resolution video file;
        applying the edit instruction to the at least one high-resolution audio file;

generating a copy of the at least one high-resolution audio file;

applying the edit instruction to the copy of the at least one high resolution audio file;

saving the copy of the at least one high-resolution video file and the copy of the at least one high-resolution audio file as an aggregate media asset forming the second high-resolution media asset.

9. The non-transitory computer readable storage medium of claim 8 further comprising instructions for:

transmitting at least a portion of the second high-resolution media asset to a remote computing device; and facilitating visible display at least a portion of the second high-resolution media asset by an image rendering device associated with the remote computing device.

10. The non-transitory computer readable storage medium of claim 8 wherein the first high-resolution media asset comprises a plurality of files and receiving a request to edit the first high-resolution media asset further comprises instructions for receiving a request to edit at least one of the plurality of files.

11. The non-transitory computer readable storage medium of claim 8 wherein receiving a request to edit a first high-resolution media asset further comprises instructions for:

receiving a request to edit the at least one high-resolution video file.

12. The non-transitory computer readable storage medium of claim 8, wherein the presentation property is selected from a group consisting of an image aspect ratio, a spatial resolution value, a temporal resolution value, a bit rate value, and a compression value, wherein receiving the edit instruction further comprises instructions for:

receiving an instruction to modify a timeline of the at least one high-resolution video file.

13. The non-transitory computer readable storage medium of claim 8 wherein transmitting the low-resolution media asset further comprises instructions for:

transmitting at least one low-resolution video file; and converting the at least one high-resolution video file associated with the first high-resolution media asset from a first file format into at least one low-resolution video file having a second file format.

14. The non-transitory computer readable storage medium of claim 8 wherein transmitting the low-resolution media asset further comprises instructions for:

transmitting at least one low-resolution audio file; and converting at least one high-resolution audio file associated with the first high-resolution media asset from a first file format into at least one low-resolution audio file having a second file format.

15. A system comprising:

a plurality of processors;

a high-resolution media asset library associated with a computer readable storage medium;

a low-resolution media asset generator implemented by at least one of said plurality of processors that generates low-resolution media assets from high-resolution media assets contained in the high-resolution media asset library;

a high-resolution media asset editor implemented by at least one of said plurality of processors that applies edits to a first high-resolution media asset based on edits made to an associated low-resolution media asset, the edits to the low-resolution media asset identify keyframes that are consistent between the low-resolution media asset and the first high-resolution media asset, the edits comprising instructions to modify a presentation property of at least one high resolution video file comprised within the first high-resolution media asset and an instruction to modify a format property of at least one high-resolution audio file comprised within the first high-resolution media asset; and a master asset editor implemented by at least one of said plurality of processors that generates a second high-resolution media asset different from the first high-resolution media asset, said second high-resolution media asset generation comprises:

applying the instructions to the at least one high-resolution video file;

generating a copy of the at least one high-resolution video file;

applying the instructions to the copy of the at least one high-resolution video file;

applying the edit instruction to the at least one high-resolution audio file;

generating a copy of the at least one high-resolution audio file;

applying the edit instruction to the copy of the at least one high resolution audio file;

saving the copy of the at least one high-resolution video file and the copy of the at least one high-resolution audio file as an aggregate media asset forming the second high-resolution media asset.

16. The system of claim 15 further comprising:

a low-resolution media asset editor, on a computing device remote from the high resolution media asset editor, that transmits edits made to the associated low-resolution media asset; and an image rendering device, on a computing device remote from the high-resolution media asset editor, that displays the associated low-resolution media asset.

* * * * *